US012564534B2

(12) United States Patent
Brown

(10) Patent No.: US 12,564,534 B2
(45) Date of Patent: Mar. 3, 2026

(54) VACUUM MASSAGER

(71) Applicant: FKA DISTRIBUTING CO., LLC, Commerce Township, MI (US)

(72) Inventor: Karen Brown, Tunbridge Wells (GB)

(73) Assignee: FKA Distributing Co., LLC, Commerce Township, MI (US)

(*) Notice: Subject to any disclaimer, the term of this patent is extended or adjusted under 35 U.S.C. 154(b) by 919 days.

(21) Appl. No.: 17/775,241

(22) PCT Filed: Nov. 9, 2020

(86) PCT No.: PCT/US2020/059743
§ 371 (c)(1),
(2) Date: May 6, 2022

(87) PCT Pub. No.: WO2021/092586
PCT Pub. Date: May 14, 2021

(65) Prior Publication Data

US 2022/0395421 A1 Dec. 15, 2022

Related U.S. Application Data

(60) Provisional application No. 62/932,628, filed on Nov. 8, 2019.

(51) Int. Cl.
*A61H 9/00* (2006.01)

(52) U.S. Cl.
CPC ... *A61H 9/0057* (2013.01); *A61H 2201/0153* (2013.01); *A61H 2201/0214* (2013.01);
(Continued)

(58) Field of Classification Search
CPC .. A61H 9/005–0057; A61H 2009/0064; A61H 2201/02; A61H 2201/0207;
(Continued)

(56) References Cited

U.S. PATENT DOCUMENTS

| | | | |
|---|---|---|---|
| 3,994,290 | A | 11/1976 | Springer et al. |
| D261,428 | S | 10/1981 | Noble |

(Continued)

FOREIGN PATENT DOCUMENTS

| | | | |
|---|---|---|---|
| CN | 302145132 | S | 10/2012 |
| CN | 303161190 | S | 4/2015 |

(Continued)

OTHER PUBLICATIONS

Translation of JP-2001/029132. Accessed from PE2E-Search on Nov. 6, 2025. (Year: 2001).*

(Continued)

*Primary Examiner* — Paige Kathleen Bugg
(74) *Attorney, Agent, or Firm* — Brooks Kushman P.C.

(57) ABSTRACT

A vacuum massager includes a housing having an upper portion and a lower portion, and a cup attachment arranged to be removably received on the lower portion of the housing. An air pump is disposed within the housing in fluid communication with the cup attachment for generating suction therein, such that contact of the cup attachment with a user's skin creates a vacuum within the cup attachment. A controller is disposed within the housing in electrical communication with the air pump. The vacuum massager further includes a cooling attachment interchangeable with the cup attachment and arranged to be removably received on the lower portion of the housing in electrical communication with the controller for cooling the user's skin.

15 Claims, 11 Drawing Sheets

(52) U.S. Cl.
CPC ................ *A61H 2201/0285* (2013.01); *A61H 2201/1685* (2013.01); *A61H 2201/5023* (2013.01); *A61H 2207/00* (2013.01)

(58) Field of Classification Search
CPC .... A61H 2201/0214; A61H 2201/0285; A61H 2207/00; A61H 19/00–50
USPC .............................................................. 601/6
See application file for complete search history.

(56) References Cited

U.S. PATENT DOCUMENTS

| | | | | |
|---|---|---|---|---|
| D262,908 | S | 2/1982 | Pesco | |
| D331,466 | S | 12/1992 | Doria | |
| D346,660 | S | 5/1994 | Chiang | |
| 6,196,982 | B1 * | 3/2001 | Ball | A61H 9/0057 601/67 |
| 6,241,696 | B1 | 6/2001 | York | |
| 6,585,667 | B1 * | 7/2003 | Muller | A61H 7/008 601/6 |
| D581,541 | S | 11/2008 | Ferber et al. | |
| D581,542 | S | 11/2008 | Ferber et al. | |
| D583,064 | S | 12/2008 | Ferber et al. | |
| D583,480 | S | 12/2008 | Ferber et al. | |
| D599,029 | S | 8/2009 | Ferber et al. | |
| 8,579,837 | B1 * | 11/2013 | Makower | A61H 23/0263 601/6 |
| D704,346 | S | 5/2014 | Tai | |
| D704,347 | S | 5/2014 | Tai | |
| D715,954 | S | 10/2014 | Sedic | |
| D732,679 | S | 6/2015 | Assa et al. | |
| D733,310 | S | 6/2015 | Assa et al. | |
| D752,235 | S | 3/2016 | Levi et al. | |
| D752,237 | S | 3/2016 | Cole et al. | |
| D752,298 | S | 3/2016 | Stephens | |
| D768,867 | S | 10/2016 | Hetzel | |
| 10,098,653 | B2 | 10/2018 | Presser et al. | |
| D842,489 | S | 3/2019 | Spewock et al. | |
| 2004/0077977 | A1 | 4/2004 | Ella et al. | |
| 2009/0299234 | A1 | 12/2009 | Cho | |
| 2013/0116503 | A1 * | 5/2013 | Mertens | G16H 20/40 600/38 |
| 2015/0283022 | A1 * | 10/2015 | Lee | A61H 7/00 601/2 |
| 2016/0000643 | A1 | 1/2016 | Makower et al. | |
| 2016/0022533 | A1 * | 1/2016 | Makower | A61H 23/00 601/46 |
| 2017/0252261 | A1 * | 9/2017 | Khorassani Zadeh | A61H 9/0057 |
| 2017/0340510 | A1 | 11/2017 | Spewock et al. | |
| 2017/0360648 | A1 * | 12/2017 | Gan | A61H 23/02 |
| 2021/0128402 | A1 * | 5/2021 | Dai | A61H 23/0263 |
| 2022/0168170 | A1 * | 6/2022 | Bell | A61F 7/007 |

FOREIGN PATENT DOCUMENTS

| | | | | |
|---|---|---|---|---|
| CN | 303598414 | S | 2/2016 | |
| CN | 205252317 | U | 5/2016 | |
| CN | 205434689 | U | 8/2016 | |
| CN | 105997454 | A | 10/2016 | |
| CN | 303962039 | S | 12/2016 | |
| CN | 105396223 | B | 12/2017 | |
| CN | 304382086 | S | 12/2017 | |
| CN | 304977043 | S | 1/2019 | |
| CN | 305039285 | S | 2/2019 | |
| CN | 305105883 | S | 4/2019 | |
| CN | 305162727 | S | 5/2019 | |
| CN | 305526458 | S | 12/2019 | |
| CN | 305930902 | S | 7/2020 | |
| EP | 1045683 | B1 | 4/2004 | |
| JP | 3039531 | U | 5/1997 | |
| JP | 2822348 | B2 | 9/1998 | |
| JP | 2001029132 | A * | 2/2001 | |
| JP | 2003180843 | A | 7/2003 | |
| JP | 200473812 | A | 3/2004 | |
| JP | 1374489 | S | 11/2009 | |
| JP | 1412610 | S | 5/2011 | |
| JP | 1513737 | S | 12/2014 | |
| JP | 201616030 | A | 2/2016 | |
| JP | 1551485 | S | 6/2016 | |
| JP | 1559626 | S | 9/2016 | |
| JP | 1562983 | S | 11/2016 | |
| JP | 1562989 | S | 11/2016 | |
| JP | 1562998 | S | 11/2016 | |
| JP | 1572611 | S | 3/2017 | |
| KR | 1020090106945 | A | 10/2009 | |
| KR | 200458861 | Y1 * | 3/2012 | A61H 9/0057 |
| KR | 1020150114829 | A | 10/2015 | |
| KR | 1020160137144 | A | 11/2016 | |
| WO | WO-2009147618 | A1 * | 12/2009 | A61H 23/0254 |

OTHER PUBLICATIONS

Translation of KR-2004/58861. Accessed from PE2E-Search on Nov. 6, 2025. (Year: 2004).*

Extended European Search Report for Application No. 20884616.2, dated Nov. 8, 2023, 9 pages.

International Search Report and Written Opinion for Application No. PCT/US2020/059743, dated Mar. 8, 2021, 10 pages.

International Preliminary Report on Patentability for Application No. PCT/US2020/059743, dated May 10, 2022, 7 pages.

HoMedics, "smoothee instruction manual", CELL-500-SA, 4 pages, 2017.

Europe Examination Report for Application No. 20 884 616.2, dated Apr. 24, 2025, 5 pages.

* cited by examiner

VACUUM MASSAGER

CROSS-REFERENCE TO RELATED APPLICATIONS

This application is the U.S. national phase of PCT Application No. PCT/US2020/059743 filed Nov. 9, 2020, which claims the benefit of U.S. provisional application Ser. No. 62/932,628 filed Nov. 8, 2019, the disclosures of which are hereby incorporated in their entirety by reference herein.

TECHNICAL FIELD

Embodiments relate to a vacuum massager with various treatment attachments.

BACKGROUND

Cupping is an ancient therapy originating from Chinese culture which involves placing cups on a person's skin to create suction for treating a wide variety of conditions. In one type of cupping treatment, the cup may be heated and the open end placed on the skin. As the air inside the cup cools, it creates a vacuum that draws the skin into the cup to impart a therapeutic effect. The cup remains in a stationary position on an area of the skin for a set time, such as between 3 to 10 minutes. Alternatively, cupping treatment may be accomplished using a manual or automated pump, such as a silicone cup, to create a vacuum inside the cup and suction the skin. Cupping may increase blood circulation to the area of the body where the cups are placed, thereby facilitating body healing, promoting cell repair, and relieving pain, inflammation, and muscle tension.

SUMMARY

In one or more embodiments, a vacuum massager includes a housing having an upper portion and a lower portion, and a cup attachment arranged to be removably received on the lower portion of the housing. An air pump is disposed within the housing in fluid communication with the cup attachment for generating suction therein, such that contact of the cup attachment with a user's skin creates a vacuum within the cup attachment. A controller is disposed within the housing in electrical communication with the air pump. The vacuum massager further includes a cooling attachment interchangeable with the cup attachment and arranged to be removably received on the lower portion of the housing in electrical communication with the controller for cooling the user's skin.

In one or more embodiments, a vacuum massager includes a housing having an upper portion and a lower portion, and a cup attachment arranged to be removably received on the lower portion of the housing. An air pump is disposed within the housing in fluid communication with the cup attachment for generating suction therein, such that contact of the cup attachment with a user's skin creates a vacuum within the cup attachment. The vacuum massager further includes a controller disposed within the housing in electrical communication with the air pump, and a strap connected to the housing and extending above the upper portion. A user interface is disposed on a front portion of the housing in electrical communication with the controller for activating the air pump and selecting a vacuum intensity level, wherein the user interface is accessible during operation of the vacuum massager with a user's hand received between the strap and the upper portion of the housing.

In one or more embodiments, a vacuum massager includes a housing having an upper portion and a lower portion, the housing having a front portion and a rear portion which are joined at the upper portion. A cup attachment is arranged to be removably received on the lower portion of the housing, and an air pump is disposed within the housing in fluid communication with the cup attachment for generating suction therein, such that contact of the cup attachment with a user's skin creates a vacuum within the cup attachment. The vacuum massager further includes a controller disposed within the housing in electrical communication with the air pump. The rear portion of the housing has a different contour and is constructed from a different material than the front portion to facilitate gripping of the upper portion of the housing during operation of the vacuum massager.

DETAILED DESCRIPTION

Figure 1:
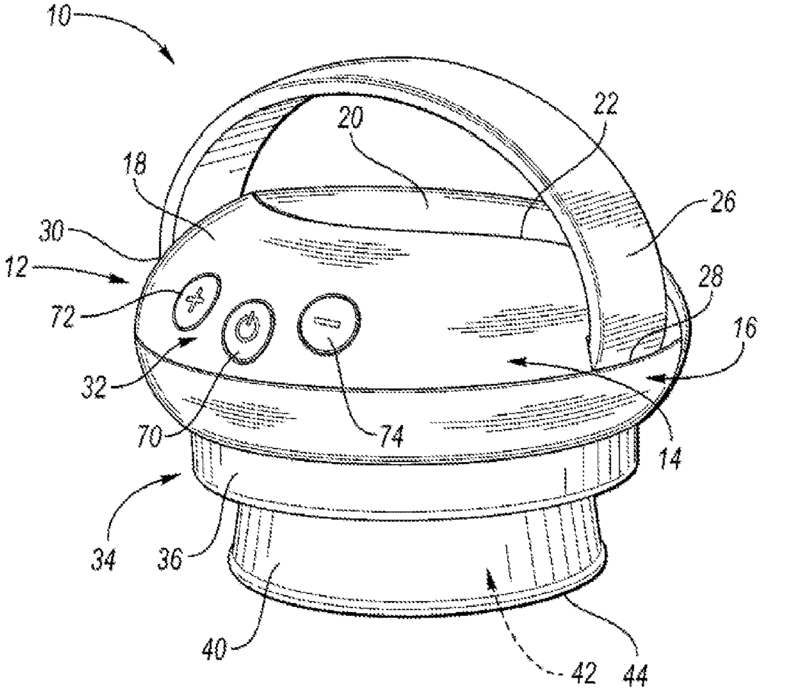
FIG. 1 is a perspective view of a vacuum massager according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference first to FIGS. 1-6, a vacuum massager 10 is illustrated having various attachments for providing vacuum cupping and treatment of a user's skin. As described below, the vacuum massager 10 employs cup attachments to effectively apply suction to areas of the skin for cupping therapy, provides a massage surface for contacting and massaging the skin during treatment, can be moved easily along the skin for imparting the massaging effect, and offers a cooling attachment interchangeable with the cup attachments for soothing the skin.

Cellulite is a condition in which the skin has a lumpy, dimpled appearance caused by areas of unmetabolized fat, water and trapped waste beneath the skin pushing up against surrounding fibrous connective tissue. Cellulite may appear on the buttocks, the thighs and the arms, for example. The vacuum massager 10 disclosed herein may be used to reduce the appearance of cellulite by stimulating the skin, boosting circulation, reducing fluid retention, and activating fat cell metabolism to break down fat deposits.

In one or more embodiments, the vacuum massager 10 includes a generally curved housing 12 having an upper portion 14 and a lower portion 16. A front portion 18 and a rear portion 20 of the housing 12 are also defined which are joined at a parting line 22 at the upper portion 14 of the housing 12. A handle or strap 26 is connected to the housing 12 and extends above the upper portion 14 from a first side 28 to a second side 30 thereof, wherein the strap 26 may be constructed from silicone or another suitable material. The rounded, pebble-like shape of the housing 12 allows for an easy palm grip by the user by sliding his/her hand under the strap 26 from the rear portion 20 to the front portion 18.

Figure 4:
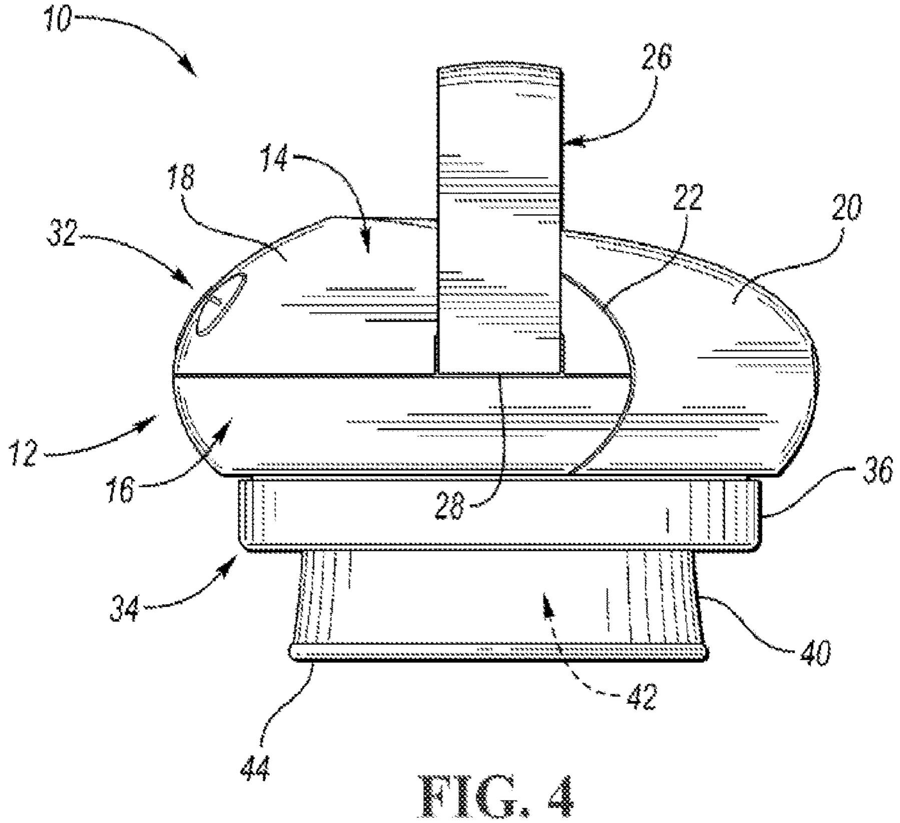
FIG. 4 is a right side view of the vacuum massager.
Figure 5:
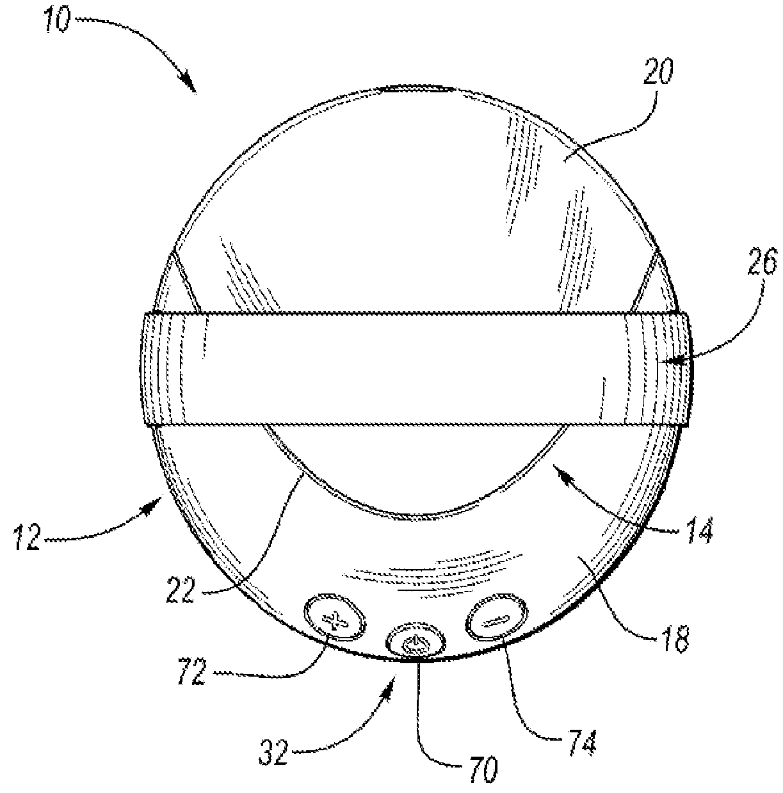
FIG. 5 is a top view of the vacuum massager.

In one or more embodiments, the front portion 18 and the rear portion 20 may have different contours or curvatures, such as with the rear portion 20 sloping upwardly to meet the front portion 18 at the parting line 22, as best shown in FIG. 4. Such a contour may facilitate gripping of the housing 12 by a user, thus reducing user effort required during operation of the vacuum massager 10 and movement of the vacuum massager 10 in any direction. Furthermore, in this position, a user's fingers are in an ergonomic position to access a user interface 32 disposed on the front portion 18 of the housing for operating the vacuum massager 10, as described further below. In one or more embodiments, different materials could be used for constructing the front portion 18 and the rear portion 20, such as a plastic material for the front portion 18 and a silicone material or other soft surface for the rear portion 20, thereby providing cushioning for a user's palm during use of the vacuum massager 10. Although a particular shape of the housing 12 is shown and described, it is understood that the vacuum massager 10 is not limited to this shape and that other configurations and contours are fully contemplated.

Figure 2:
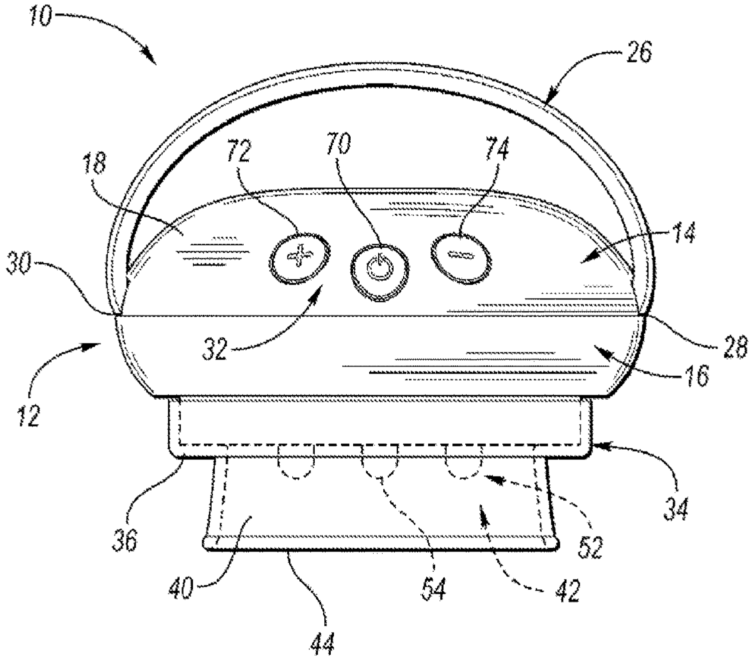
FIG. 2 is a front view of a vacuum massager according to one or more embodiments.

With reference to FIGS. 1-4, the vacuum massager 10 includes a cup attachment 34 removably received on the housing 12. As best shown in FIG. 2, the cup attachment 34 may have a generally cylindrical proximal portion 36 sized to be removably received on the lower portion 16 of the housing 12. The cup attachment 34 may have a generally cylindrical distal portion 40 with a hollow interior 42 and a bottom rim 44 arranged to be placed against a user's skin. The cup attachment 34 may be transparent or opaque and may be constructed from a plastic material such as, but not limited to, polycarbonate.

Figure 7:
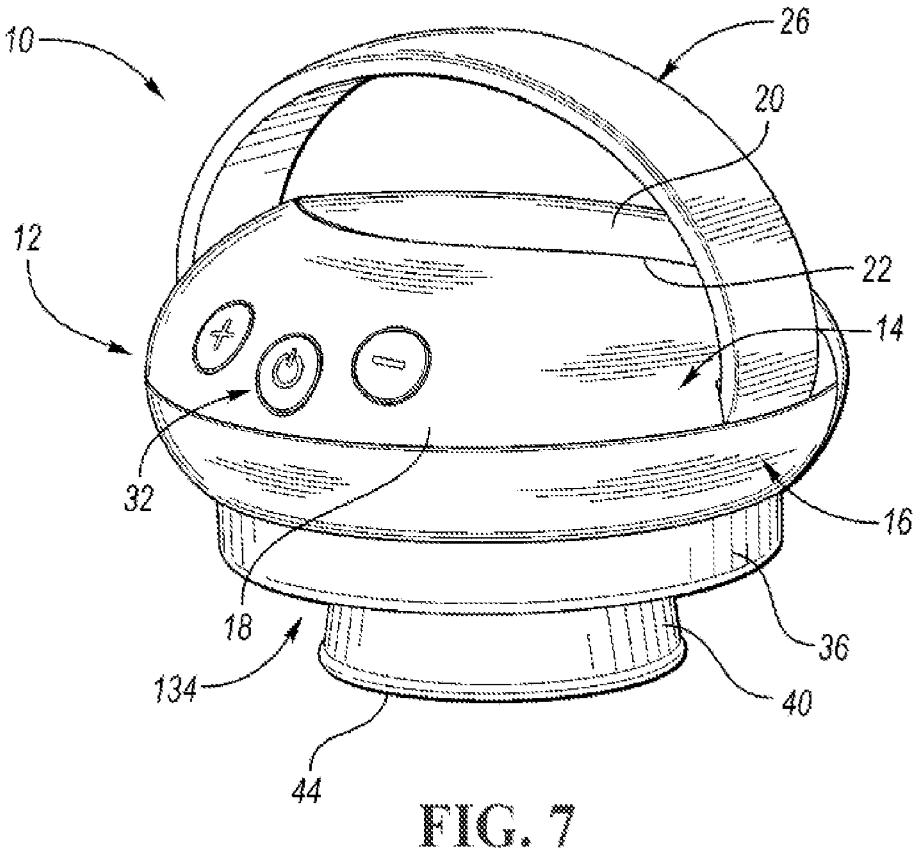
FIG. 7 is a perspective view of a vacuum massager according to another embodiment.
Figure 8:
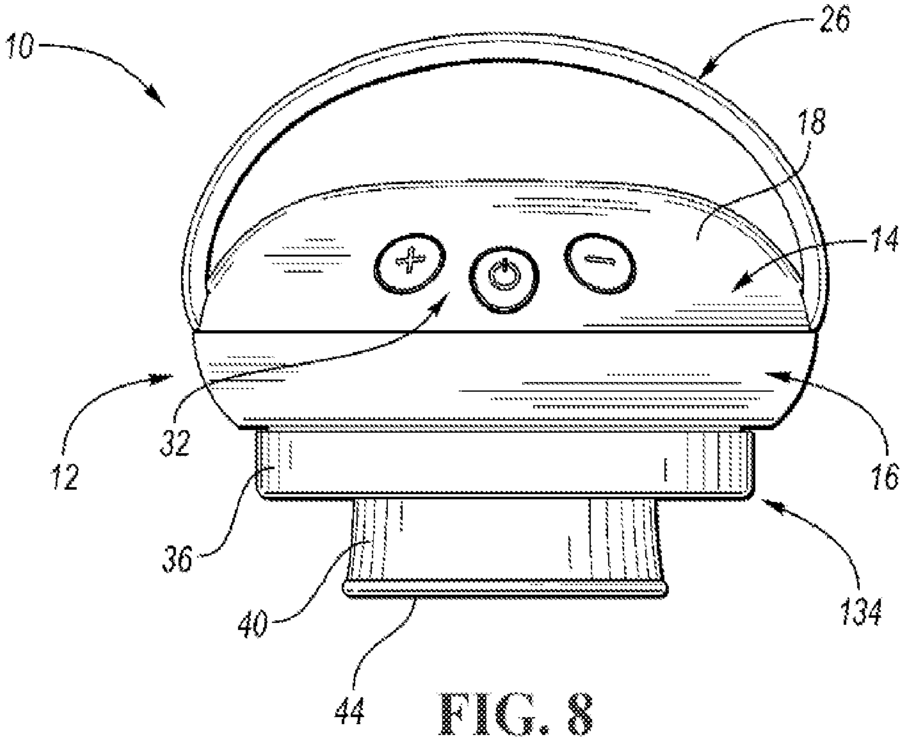
FIG. 8 is a front view of the vacuum massager of FIG. 7.
Figure 9:
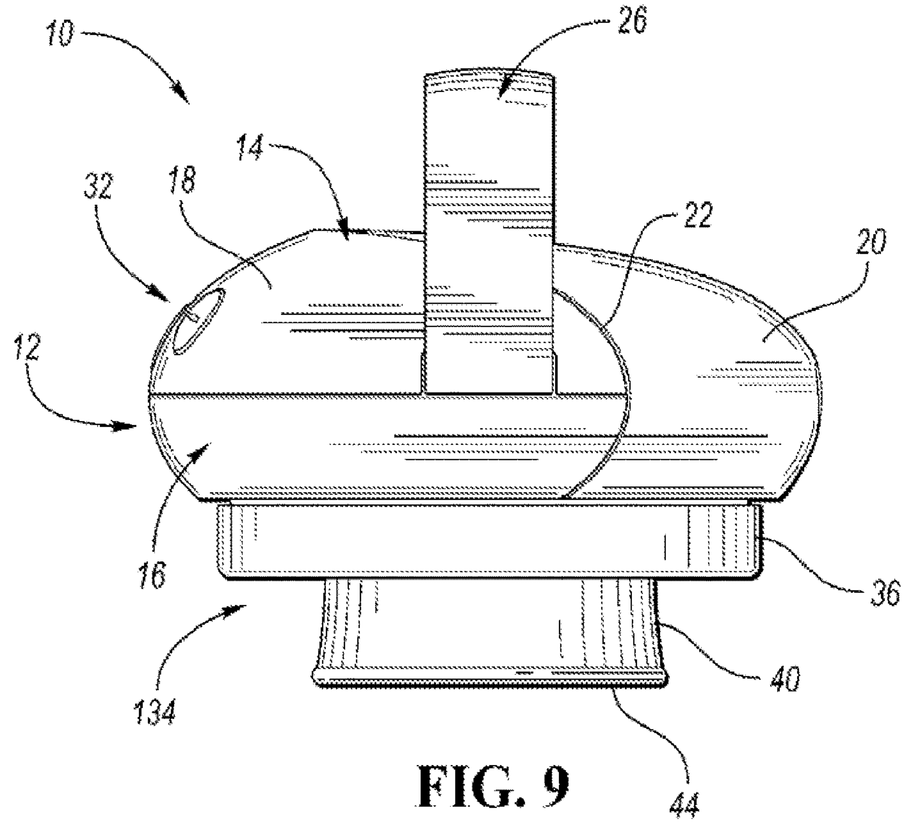
FIG. 9 is a right side view of the vacuum massager of FIG. 7.
Figure 10:
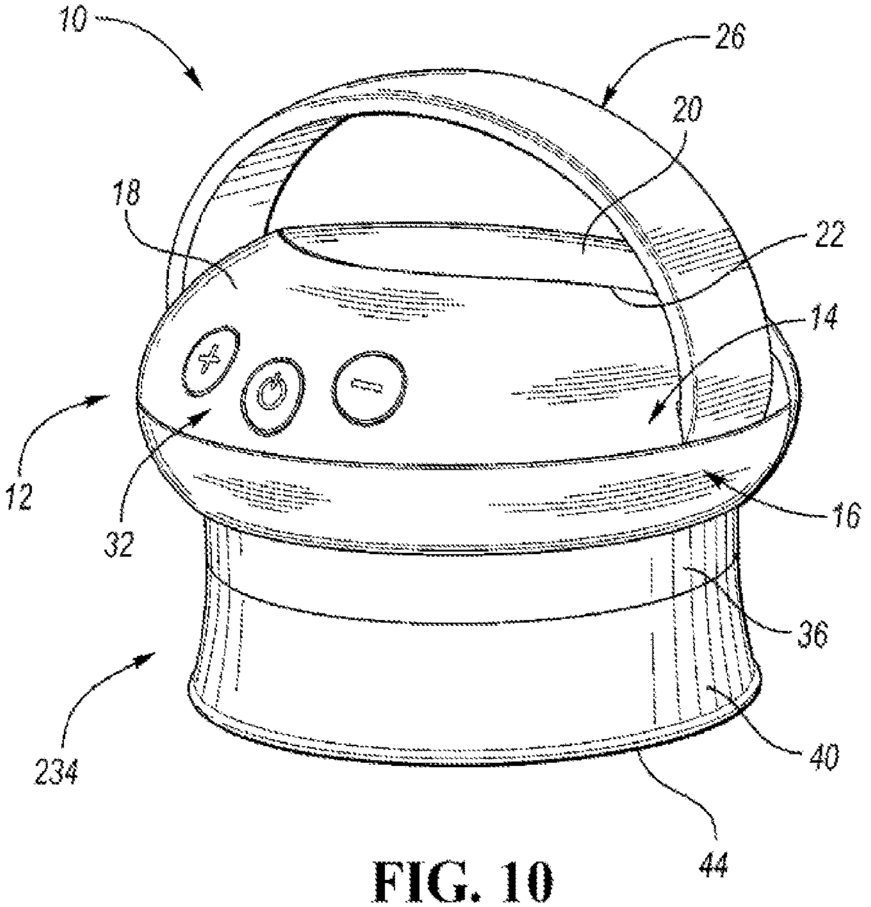
FIG. 10 is a perspective view of a vacuum massager according to another embodiment.
Figure 11:
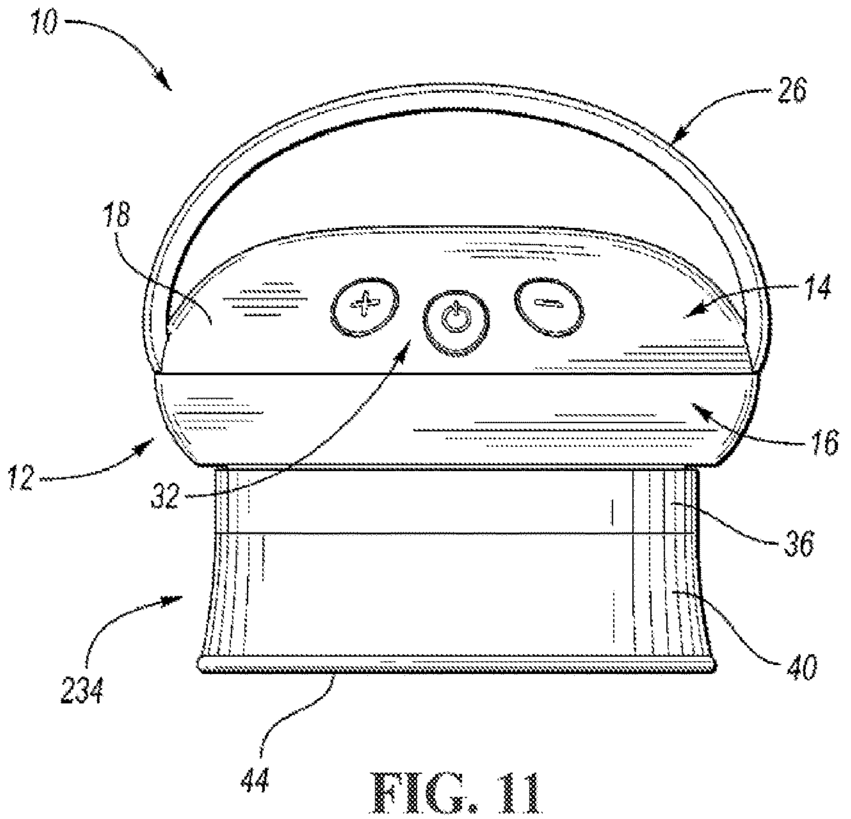
FIG. 11 is a front view of the vacuum massager of FIG. 10.
Figure 12:
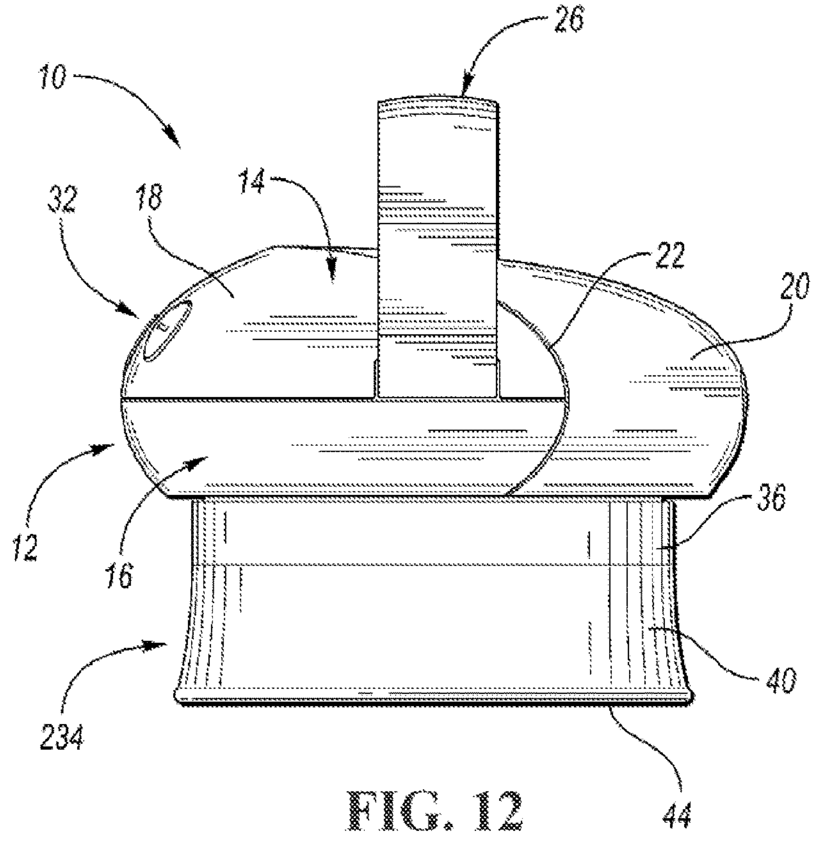
FIG. 12 is a right side view of the vacuum massager of FIG. 10.
Figure 13:
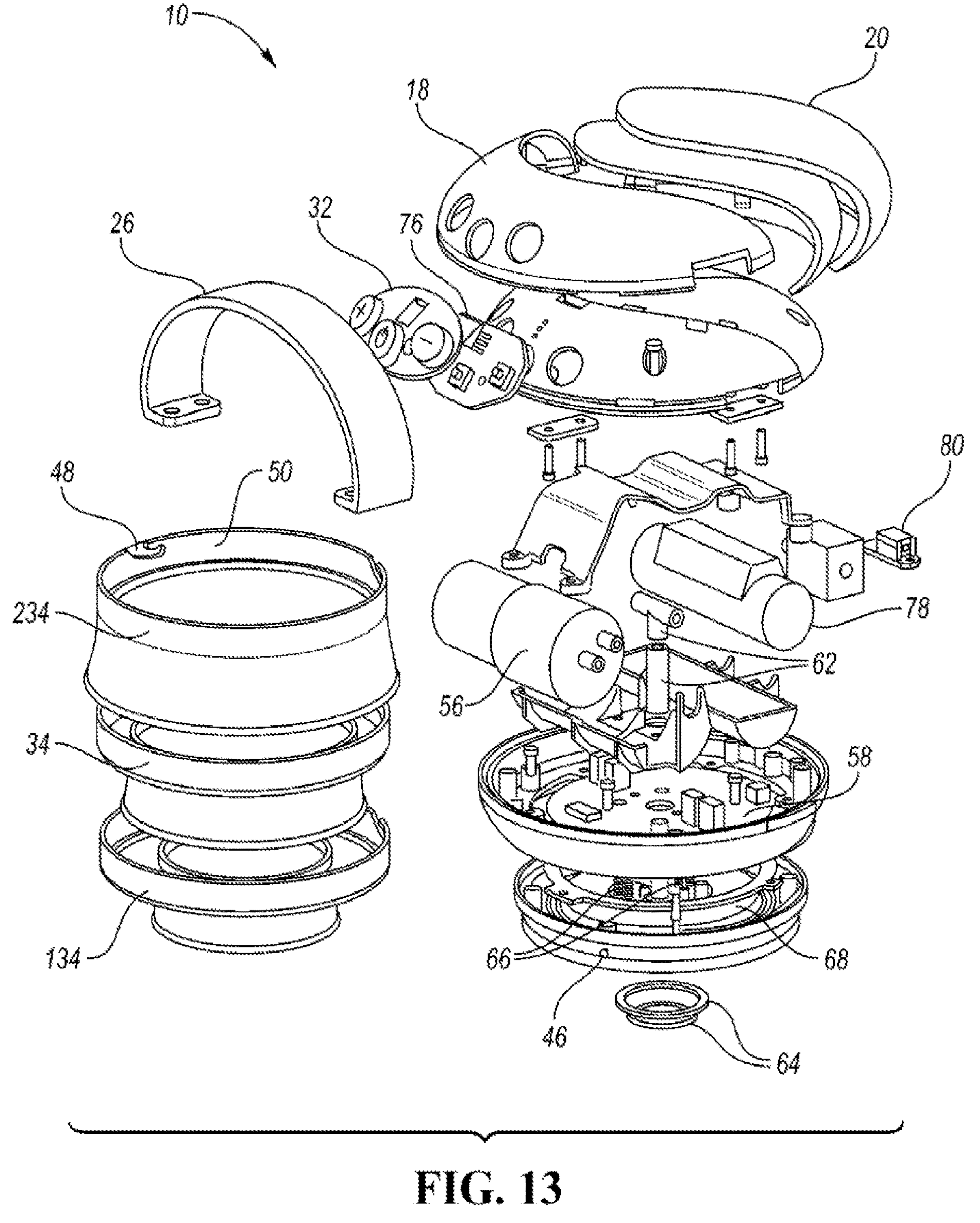
FIG. 13 is an exploded view of a vacuum massager according to one or more embodiments.
Figure 14:
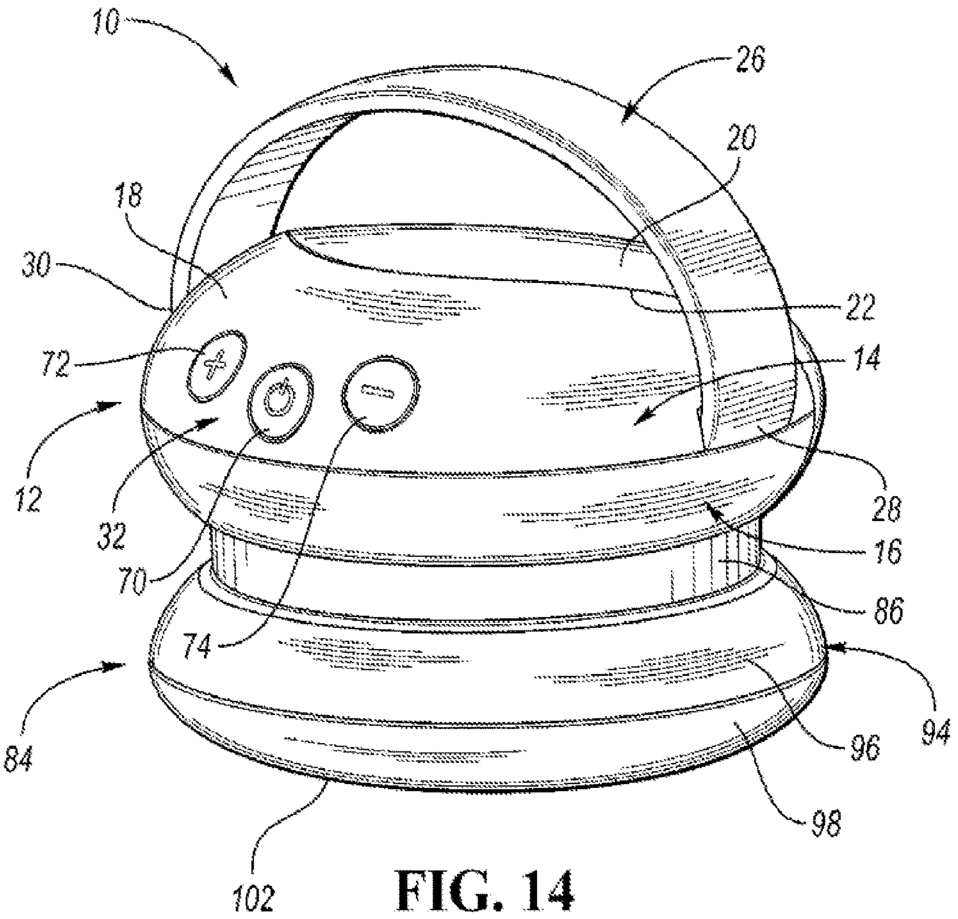
FIG. 14 is a perspective view of a vacuum massager with a cooling attachment according to one or more embodiments.
Figure 20:
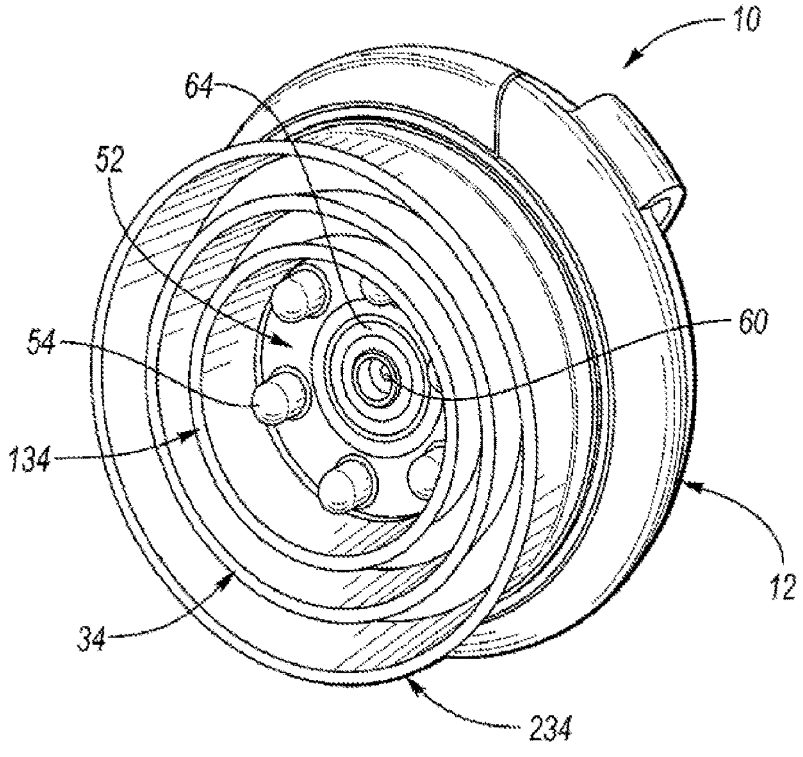
FIG. 20 is a bottom perspective view of a vacuum massager illustrating the different sized cups superimposed upon each other to illustrate relative size.

A plurality of different sizes of cup attachments 34 may be provided which are suited to treating different areas of the body. For example, FIGS. 1-4 illustrate a medium size cup attachment 34 where a radius of the distal portion 40 is smaller than a radius of the proximal portion 36. FIGS. 7-9 illustrate a small size cup attachment 134 where the radius of the distal portion 140 is smaller than the radius of the proximal portion 36 and is also smaller than the radius of the distal portion 40 of the medium size cup attachment 34. FIGS. 10-12 illustrate a large size cup attachment 234 where the distal portion 240 has a radius substantially equal to the radius of the proximal portion 36. FIG. 13 illustrates the three exemplary sizes of the cup attachments 34, 134, 234 next to each other, and FIG. 20 shows the three sizes of the cup attachments 34, 134, 234 superimposed on the housing 12 to illustrate the relative size difference between the cup attachments 34, 134, 234. In non-limiting examples, the medium and large size cup attachments 34, 234 may be suited for larger body treatment areas such as the thighs and buttocks, and the medium and small size cup attachments 34, 134 may be suited for smaller body treatment areas such as the arms and calves. The number and relative sizes of the cup attachments 34, 134, 234 illustrated herein are not intended to be limiting, and description herein relating to the medium size cup attachment 34 may be equally applicable to the small and large size cup attachments 134, 234.

The vacuum massager 10 includes a suitable mechanism for securing and releasing the cup attachment 34 from the housing 12. With reference to FIG. 13, in one or more embodiments a projection 46 may be provided on the lower portion 16 of the housing 12 and a corresponding groove 48 may be formed on an internal surface 50 of the proximal portion 36. The groove 48 has a configuration sized to receive the projection 46 and secure the cup attachment 34 to the lower portion 16 of the housing 12 with a twisting action in a first direction. Release of the cup attachment 34 may then be accomplished by twisting in a second, opposite direction to disengage the projection 46 from the groove 48. Other possible attachment mechanisms may include, but are not limited to, snap fit, slidable or threaded connections between the cup attachment 34 and the housing 12.

Figure 6:
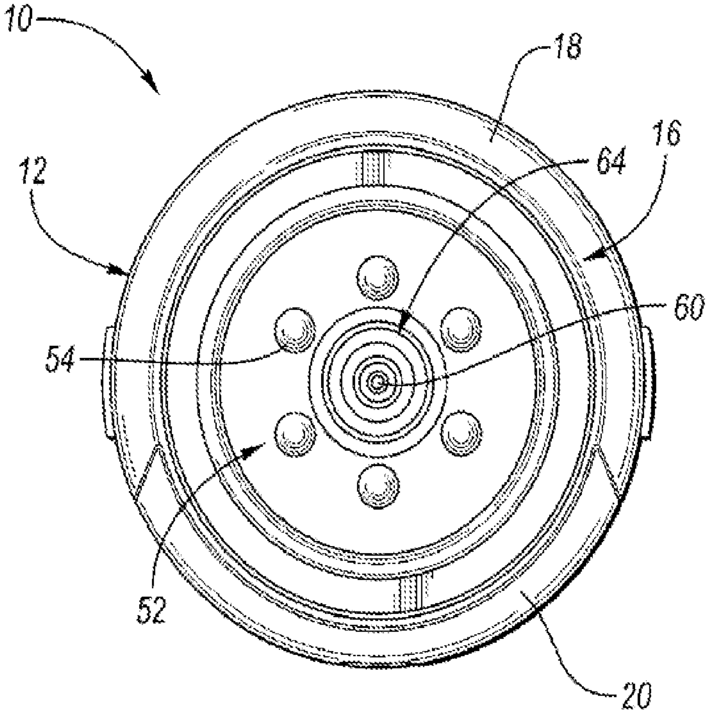
FIG. 6 is a bottom view of the vacuum massager.

FIGS. 2, 6, and 20 illustrate a massage formation 52 of the vacuum massager 10 which is disposed on the lower portion 16 of the housing 12. In one or more embodiments, the massage formation 52 may include a plurality of spaced, stationary massage nodes 54 which may be constructed from a plastic or silicone material, for example. In an alternative embodiment, the massage nodes 54 could be rotatable (e.g. rolling motion) with respect to the lower portion 16. Although six massage nodes 54 are illustrated herein, this number is not intended to be limiting, and other configurations of the massage formation 52 are fully contemplated. The massage formation 52 is configured to contact the skin as it is pulled into the cup attachment 34 during vacuum cupping treatment, acting to massage the skin and to help, for example, to agitate fat cells and assist in breaking up stubborn fat deposits.

Referring to the exploded view of FIG. 13, an air pump 56 is disposed in the housing 12 in electrical communication with a controller 58, such as a printed circuit board (PCB). The air pump 56 is in fluid communication with a port 60 (FIG. 6) in the lower portion 16 of the housing 12, such as via tubes 62, in order to create suction and a vacuum within the cup attachment 34 when it is placed on the skin. As shown, in one or more embodiments, the massage nodes 54 may be arranged circumferentially around the port 60. The controller 58 is in electrical communication with electrical contacts which may be in the form of conductive rings 64 provided on the lower portion 16 of the housing 12, such as via conductive springs 66. In one or more embodiments, the conductive rings 64 may be positioned to surround the port 60 and be disposed inboard of the massage nodes 54 as illustrated in FIG. 6.

A heating element 68, such as an infrared heating element, may be disposed within the housing 12 (see FIG. 13) in electrical communication with the controller 58 for conveying heat to the skin underneath and within the cup attachment 34. Infrared light penetrates beneath the skin, triggering regeneration on a cellular level. As such, the infrared heating element 68 may enhance the vacuum cupping and massage treatment, producing faster and more effective results. In one non-limiting example, the infrared heating element 68 may reach and maintain a temperature of 50° C. within 3 min.

With reference to FIGS. 1, 2 and 13, the user interface 32 is in electrical communication with the controller 58 and includes a power button 70 which functions to turn the vacuum suction (i.e. air pump 56) on and off, and a plus (+) button 72 and minus (–) button 74 to select the intensity level of the vacuum suction. As described above, the user interface 32 is easily accessible by the user while gripping the housing 12 during operation of the vacuum massager 10. The controller 58 can provide multiple vacuum intensity levels through the cup attachment 34 to optimize comfort and effectiveness for a user. Both continuous vacuum suction settings and less intense intermittent vacuum suction settings may be provided. Different vacuum intensity levels may be used for different areas of the body as desired. During use of the vacuum massager 10, suction may be released by pressing the power button 70 to turn off the air pump 56. In an alternative embodiment, a separate vacuum release button (not shown) could be provided.

Indicator lights 76, such as LEDs (FIG. 13), may be provided to indicate when the vacuum massager 10 is powered on and to indicate the selected vacuum intensity level. An intermittent vacuum setting may be indicated by a single LED pulsing on and off. The power button 70 may additionally be used to activate the heating element 68, or alternatively an additional button (not shown) for heat activation and intensity selection could be provided.

Figure 3:
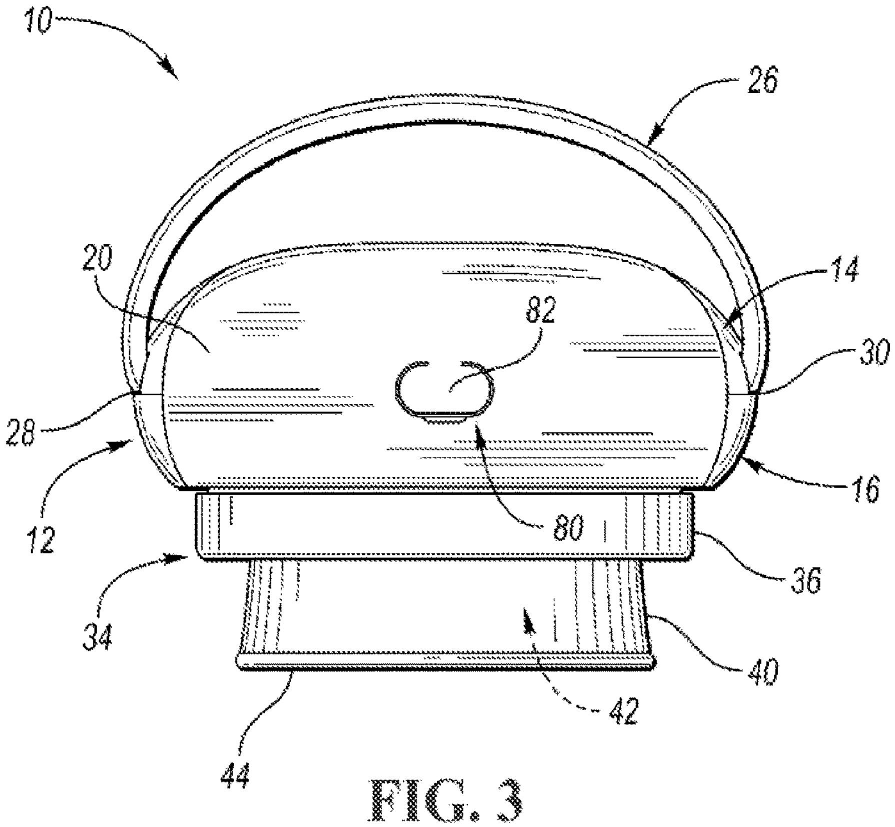
FIG. 3 is a rear view of the vacuum massager.

In one or more embodiments, the vacuum massager 10 is rechargeable and includes an internal rechargeable (e.g. lithium) battery 78 in electrical communication with a charging port 80 as shown in FIG. 13. FIG. 3 illustrates the charging port 80 on the rear portion 20 of the housing 12, covered by a flap 82. To charge the vacuum massager 10, a charging cord (not shown) may be received in the charging port 80 and connected to an electrical outlet or other power source. In an alternative embodiment, the vacuum massager 10 could dock in a charging base (not shown) for charging. In one non-limiting embodiment, a 4-hour charge may provide up to 2 hours of cordless use of the vacuum massager 10. The indicator lights 76 may be configured to light sequentially during charging and then remain lit continuously when the battery 78 is fully charged. If the vacuum massager 10 is powered on and needs to be charged, the indicator lights 76 may be configured to blink as an indication to the user.

In operation, the cup attachment 34 of the vacuum massager 10 is positioned so that the bottom rim 44 is in contact with the skin. When the power button 70 is depressed to activate the air pump 56, vacuum suction is created within the cup attachment 34 at an intensity level selected by the plus (+) button 72 and minus (–) button 74. The user's skin is drawn into the cup interior 42 via the vacuum force and into contact with the massage formation 52, simultaneously providing vacuum cupping and massage treatment. The vacuum massager 10 may be held stationary with respect to the skin or may be moved along the skin surface, such as in a circular or back and forth motion across the area to be treated. The application of pressure beyond that required to maintain contact between the bottom rim 44 and the skin is not necessary. If desired, the vacuum massager 10 may be used with oil (e.g. baby oil, olive oil, liquid coconut oil) applied to the skin to facilitate gliding of the cup attachment 34 along the skin surface.

Figure 18:
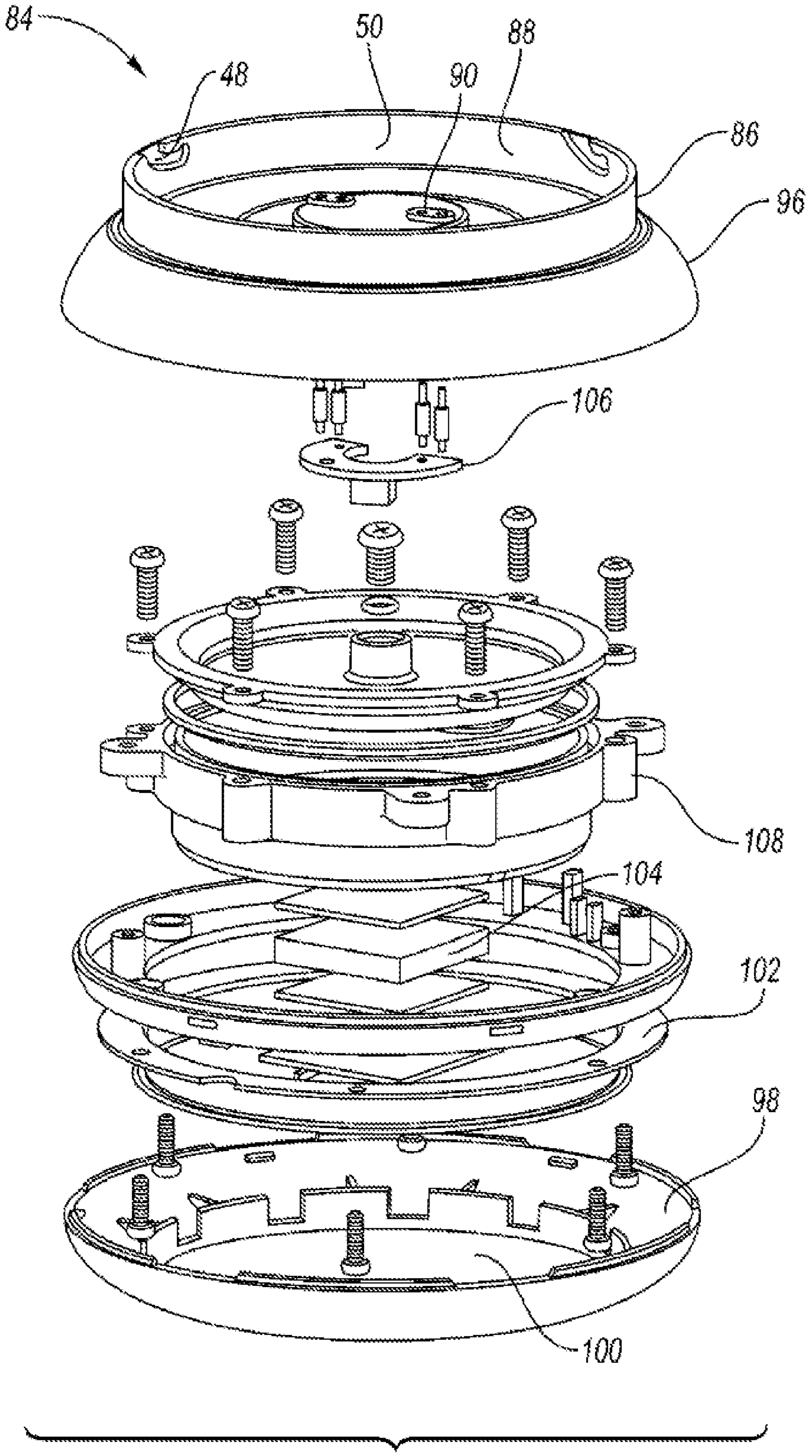
FIG. 18 is an exploded view of a cooling attachment according to one or more embodiments.
Figure 19:
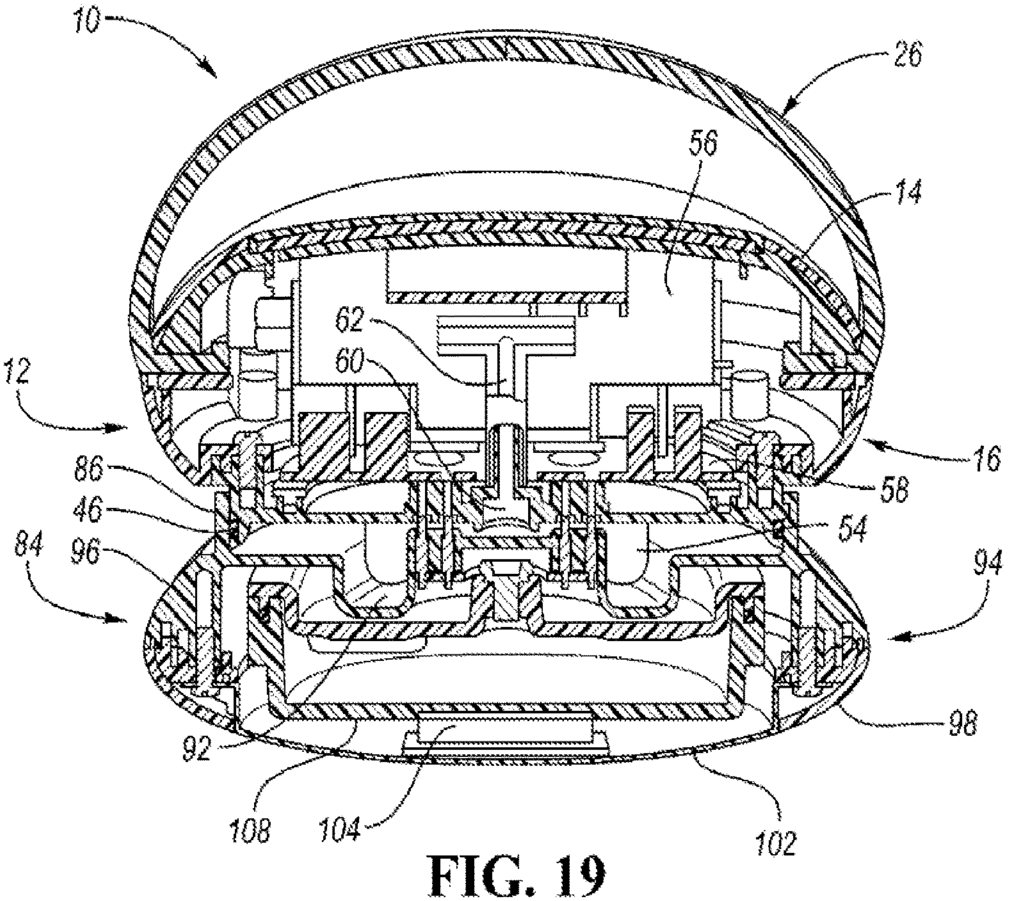
FIG. 19 is a cross-sectional view of a vacuum massager with a cooling attachment according to one or more embodiments.

In one or more embodiments, the vacuum massager 10 includes a cooling attachment 84 as illustrated in FIGS. 14-19 which is interchangeable with the cup attachment 34, thereby conveniently and advantageously provide a cooling function for the skin within the same apparatus as the vacuum treatment and massage functions. The cooling attachment 84 has a generally cylindrical top portion 86 sized to be removably received and secured on the lower portion 16 of the housing 12. As described above for the cup attachment 34, the vacuum massager 10 includes a suitable mechanism for securing and releasing the cooling attachment 84 from the housing 12. With reference to FIGS. 13 and 18-19, in one or more embodiments a projection 46 may be provided on the lower portion 16 of the housing 12 and a corresponding groove 48 may be formed on an internal surface 88 of the top portion 86. The groove 48 has a configuration sized to receive the projection 46 and secure the cooling attachment 84 to the lower portion 16 of the housing 12 with a twisting action in a first direction. Release of the cooling attachment 84 may then be accomplished by twisting in a second, opposite direction to disengage the projection 46 from the groove 48. Other possible attachment mechanisms may include, but are not limited to, snap fit, slidable or threaded connections between the cooling attachment 84 and the housing 12.

Figure 15:
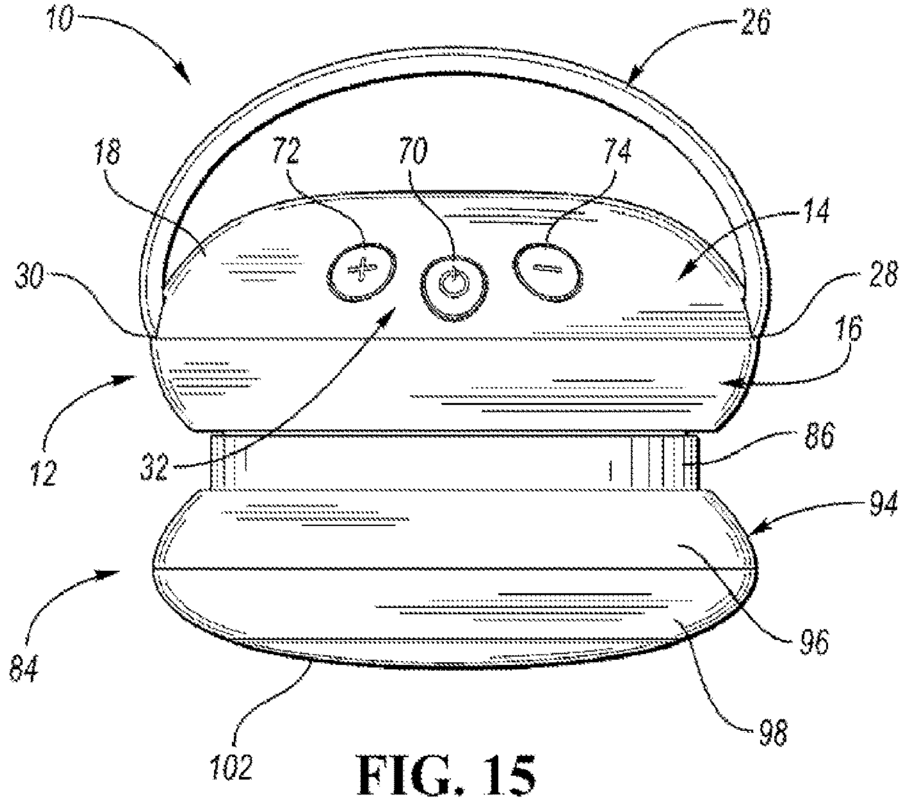
FIG. 15 is a front view of the vacuum massager of FIG. 14.
Figure 16:
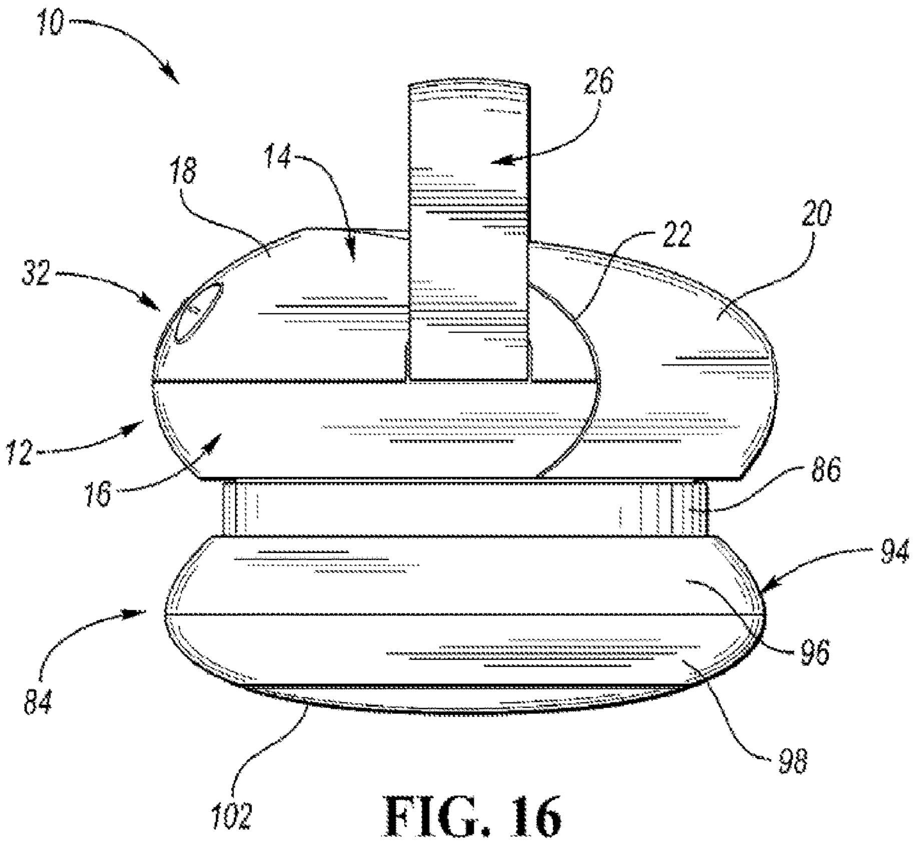
FIG. 16 is a right side view of the vacuum massager of FIG. 14.
Figure 17:
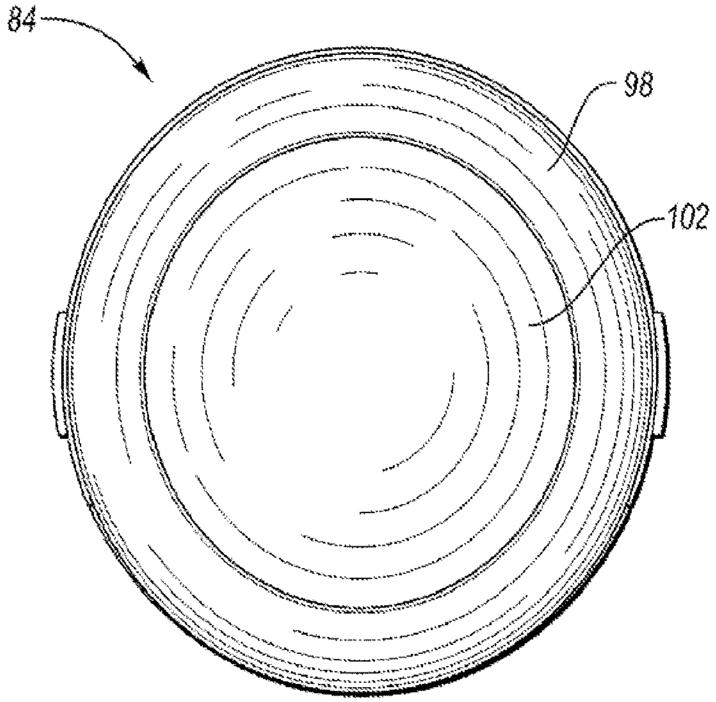
FIG. 17 is a bottom view of the vacuum massager of FIG. 14.

As shown in FIGS. 18-19, the top portion 86 has electrical contacts 90 arranged to contact the conductive rings 64 on the lower portion 16 of the housing 12 when the cooling attachment 84 is received on the housing 12, wherein the conductive rings 64 are in electrical communication with the controller 58 as described above. The top portion 86 may further include a recess 92 arranged to receive the massage nodes 54 when the cooling attachment 84 is attached to the housing 12. The cooling attachment 84 has a bottom portion 94 including an upper housing 96 connected to the top portion 86, a lower housing 98 connected to the upper housing 96 and having an aperture 100, and a cooling head 102 disposed within the aperture 100. The cooling head 102 is constructed from a metallic material and may be generally smooth and planar or have a slight curvature as best shown in FIGS. 15-16 and 19. The top portion 86 and the bottom portion 94 of the cooling attachment 84 may be constructed from a plastic material, where the cooling attachment 84 can be generally rounded and circular- or oval-shaped as shown or could alternatively have other shapes and/or textures.

The cooling head 102 may be cooled by a thermoelectric cooler or Peltier device or Peltier chip 104, as illustrated in FIGS. 18 and 19. The electrical contacts 90 are in electrical with the Peltier chip 104 via a PCB 106 in the cooling attachment 84. As is known in the art, thermoelectric coolers may operate by the Peltier effect, which creates a temperature difference by transferring heat between two electrical junctions. A Peltier device has two sides, and a voltage is applied across joined conductors to create an electric current. When a DC electric current flows through the Peltier chip 104 it transfers heat from one side to the other so that one side gets cooler while the other gets hotter. The "hot" side is attached to a heat sink 108 so that it remains at ambient temperature, while the "cool" side is below room temperature cools the cooling head 102. In operation, the cool side absorbs heat which is then transferred to the hot side of the Peltier chip 104. In a non-limiting example, the cooling head 102 may be capable of quickly dropping to a cooled temperature (e.g. reaching and maintaining 5° C. within 3 min).

In one or more embodiments, the controller 58 may be configured to automatically recognize when the cooling attachment 84 is received on the housing 12. In this instance, the air pump 56 is deactivated, the power button 70 controls activation of the cooling attachment 84, and the plus (+) button 72 and minus (1) button 74 select and adjust the level of cooling temperature of the cooling head 102. In one non-limiting example, a first level could set the temperature of the cooling head 102 at approximately 15° C., a second level could set the temperature of the cooling head 102 at approximately 10° C., and a third level could set the temperature of the cooling head 102 at approximately 5° C. The indicator lights 76 may also be used to indicate the power status of the cooling attachment 84 and the cooling level of the cooling head 102. In an alternative embodiment, the vacuum massager 10 could include a separate cooling power button for activating the cooling attachment 84 and a corresponding cooling mode indicator light (not shown).

Accordingly, after vacuum cupping and massage treatment of skin within a treatment area using the cup attachment 34, the cup attachment 34 can be interchanged with the cooling attachment 84, where the cooling head 102 can be applied to contact and cool skin within the treatment area. Use of the cooling attachment 84 on the skin may simultaneously boost circulation, soothe inflammation and any post-treatment pain, and promote skin tightening, among other benefits. The cooling attachment 184 may also generally be used for contacting and cooling the skin at other times or in other regions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vacuum massager, comprising:
- a housing having an upper portion and a lower portion;
- a cup attachment arranged to be removably received on the lower portion of the housing and configured to contact a user's skin;
- an air pump disposed within the housing in fluid communication with the cup attachment for generating suction therein, whereby contact of the cup attachment with the user's skin creates a vacuum within the cup attachment;
- massage nodes disposed in the lower portion of the housing and accessible within the cup attachment for contacting the user's skin;
- a controller disposed within the housing in electrical communication with the air pump; and
- a cooling attachment interchangeable with the cup attachment and arranged to be removably received on the lower portion of the housing in electrical communication with the controller for cooling the user's skin,
- wherein a top portion of the cooling attachment includes a recess arranged to receive the massage nodes when the cooling attachment is received on the lower portion of the housing.

2. The vacuum massager of claim 1, wherein the cup attachment has a proximal portion sized to be removably received on the lower portion of the housing and a distal portion with a hollow interior and a bottom rim.

3. The vacuum massager of claim 1, wherein the cooling attachment includes a cooling head constructed from a metallic material and cooled via a Peltier device disposed within the cooling attachment.

4. The vacuum massager of claim 1, further comprising a heating element disposed within the housing in electrical communication with the controller for conveying heat to the user's skin.

5. The vacuum massager of claim 1, wherein a user interface is disposed on a front portion of the housing in electrical communication with the controller for activating the air pump, selecting a vacuum intensity level, and controlling the cooling attachment.

6. The vacuum massager of claim 1, wherein the controller is configured to deactivate the air pump when the cooling attachment is received on the housing.

7. A vacuum massager, comprising:
- a housing having an upper portion and a lower portion;
- a cup attachment arranged to be removably received on the lower portion of the housing and configured to contact a user's skin;
- an air pump disposed within the housing in fluid communication with the cup attachment for generating suction therein, whereby contact of the cup attachment with the user's skin creates a vacuum within the cup attachment;
- massage nodes disposed in the lower portion of the housing and accessible within the cup attachment for contacting the user's skin:
- a controller disposed within the housing in electrical communication with the air pump;
- a strap connected to the housing and extending above the upper portion;
- a user interface disposed on a front portion of the housing in electrical communication with the controller for activating the air pump and selecting a vacuum intensity level, wherein the user interface is configured to be accessible during operation of the vacuum massager with the user's hand received between the strap and the upper portion of the housing; and
- a cooling attachment interchangeable with the cup attachment and arranged to be removably received on the lower portion of the housing in electrical communication with the controller for cooling the user's skin,
- wherein a top portion of the cooling attachment includes a recess arranged to receive the massage nodes when the cooling attachment is received on the lower portion of the housing.

8. The vacuum massager of claim 7, further comprising a heating element disposed within the housing in electrical communication with the controller for conveying heat to the user's skin.

9. The vacuum massager of claim 7, wherein the cooling attachment includes a cooling head constructed from a metallic material and cooled via a Peltier device disposed within the cooling attachment.

10. The vacuum massager of claim 9, wherein the controller is configured to deactivate the air pump when the cooling attachment is received on the housing so that the user interface is configured to control activation of the cooling head.

11. A vacuum massager, comprising:

a housing having an upper portion and a lower portion, the housing having a front portion and a rear portion which are joined at the upper portion;

a cup attachment arranged to be removably received on the lower portion of the housing and configured to contact a user's skin;

an air pump disposed within the housing in fluid communication with the cup attachment for generating suction therein, whereby contact of the cup attachment with the user's skin creates a vacuum within the cup attachment;

massage nodes disposed in the lower portion of the housing and accessible within the cup attachment for contacting the user's skin; and a controller disposed within the housing in electrical communication with the air pump, wherein the rear portion of the housing has a different contour and is constructed from a different material than the front portion to facilitate gripping of the upper portion of the housing during operation of the vacuum massager; and a cooling attachment interchangeable with the cup attachment and arranged to be removably received on the lower portion of the housing in electrical communication with the controller for cooling the user's skin, wherein a top portion of the cooling attachment includes a recess arranged to receive the massage nodes when the cooling attachment is received on the lower portion of the housing.

12. The vacuum massager of claim 11, further comprising a heating element disposed within the housing in electrical communication with the controller for conveying heat to the user's skin.

13. The vacuum massager of claim 11, wherein a user interface is disposed on the front portion of the housing in electrical communication with the controller for activating the air pump and selecting a vacuum intensity level.

14. The vacuum massager of claim 11, wherein the cooling attachment includes a cooling head constructed from a metallic material and cooled via a Peltier device disposed within the cooling attachment.

15. The vacuum massager of claim 11, wherein the controller is configured to deactivate the air pump when the cooling attachment is received on the housing.

* * * * *